(12) United States Patent
Nadger et al.

(10) Patent No.: US 11,356,317 B2
(45) Date of Patent: Jun. 7, 2022

(54) ALARM PRIORITIZATION IN A 5G TELCO NETWORK

(71) Applicant: VMWARE, INC., Palo Alto, CA (US)

(72) Inventors: Girish Nadger, Palo Alto, CA (US); Somenath Pal, Bangalore (IN); Somaresh Sahu, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/792,329

(22) Filed: Feb. 17, 2020

(65) Prior Publication Data

US 2021/0194753 A1 Jun. 24, 2021

(30) Foreign Application Priority Data

Dec. 24, 2019 (IN) .............................. 201941053700

(51) Int. Cl.
| | | |
|---|---|---|
| *H04L 41/0604* | (2022.01) | |
| *H04L 41/0631* | (2022.01) | |
| *G06F 9/54* | (2006.01) | |
| *H04L 41/22* | (2022.01) | |
| *H04L 67/75* | (2022.01) | |
| *H04L 41/0226* | (2022.01) | |

(52) U.S. Cl.
CPC .......... *H04L 41/0609* (2013.01); *G06F 9/542* (2013.01); *H04L 41/0226* (2013.01); *H04L 41/0631* (2013.01); *H04L 41/22* (2013.01); *H04L 67/36* (2013.01)

(58) Field of Classification Search
CPC ............. H04L 41/0609; H04L 41/0226; H04L 41/0631; H04L 41/22; H04L 67/36; G06F 9/542
See application file for complete search history.

(56) References Cited

U.S. PATENT DOCUMENTS

| | | | |
|---|---|---|---|
| 7,701,843 B1 | 4/2010 | Licari | |
| 8,041,799 B1 | 10/2011 | Usery | |
| 9,736,046 B1 * | 8/2017 | Jain ...................... | H04L 43/0823 |
| 10,097,690 B1 * | 10/2018 | Henry ................. | H04M 3/5183 |
| 10,127,799 B2 | 11/2018 | Janchookiat | |
| 10,372,872 B2 | 8/2019 | Brelje | |
| 10,761,516 B2 * | 9/2020 | Sinha ................. | G05B 19/4065 |

(Continued)

*Primary Examiner* — William G Trost, IV
*Assistant Examiner* — Abdelbasst Talioua
(74) *Attorney, Agent, or Firm* — Clayton, McKay & Bailey, PC

(57) ABSTRACT

Examples herein describe systems and methods for alarm prioritization in a Telco network. A prioritization engine can receive root cause problems and impacted network components from a network analysis module. The prioritization engine can define a mapping matrix that weights the problems according to network component type and service level. Using the problem weights, the prioritization engine can construct a problem-impact matrix that includes impact weights. The impact weights can be summed for each problem, as can the problem weights. The problems with the highest summed weights can then be prioritized first. The summed weights can also be based on predicted failure costs, such that the most expensive problems are prioritized first. The prioritization engine can send prioritized alerts for the problems for display on a graphical user interface ("GUI").

20 Claims, 8 Drawing Sheets

(56) References Cited

U.S. PATENT DOCUMENTS

| | | | |
|---|---|---|---|
| 2002/0174384 A1* | 11/2002 | Graichen | G06F 11/008 714/37 |
| 2009/0281858 A1* | 11/2009 | Dorhmi | G06Q 10/06 705/7.25 |
| 2013/0039360 A1* | 2/2013 | Manian | H04L 67/10 370/352 |
| 2014/0282586 A1* | 9/2014 | Shear | G06Q 10/0631 718/104 |
| 2015/0347189 A1* | 12/2015 | Steffen | G06F 9/4893 718/103 |
| 2016/0004551 A1* | 1/2016 | Terayama | G06F 9/45558 718/1 |
| 2016/0028645 A1* | 1/2016 | Hohn | H04L 41/0654 709/224 |
| 2016/0112244 A1* | 4/2016 | Wallerstein | G06Q 10/10 709/224 |
| 2016/0117195 A1* | 4/2016 | Wang | G06F 16/24549 707/770 |
| 2016/0269427 A1* | 9/2016 | Haugsnes | G06F 16/245 |
| 2016/0352361 A1* | 12/2016 | Fonseka | H03M 13/1102 |
| 2017/0230229 A1* | 8/2017 | Sasturkar | G06F 16/285 |
| 2017/0318091 A1* | 11/2017 | Ke | H04L 41/5054 |
| 2017/0364345 A1* | 12/2017 | Fontoura | G06F 8/65 |
| 2018/0091394 A1* | 3/2018 | Richards | H04L 47/65 |
| 2018/0115455 A1* | 4/2018 | Serrano Garcia | H04L 43/0817 |
| 2018/0123864 A1* | 5/2018 | Tucker | H04L 41/065 |
| 2019/0205153 A1 | 7/2019 | Niestemski | |
| 2019/0278600 A1* | 9/2019 | Frumkin | G06N 3/0472 |
| 2019/0318604 A1 | 10/2019 | Stern | |
| 2021/0026897 A1* | 1/2021 | Rathje | G06F 16/3344 |
| 2021/0160162 A1* | 5/2021 | Abbas | H04L 67/10 |
| 2021/0182418 A1* | 6/2021 | Oqaily | H04L 9/14 |
| 2021/0203673 A1* | 7/2021 | dos Santos | H04L 63/1416 |
| 2021/0359899 A1* | 11/2021 | Wang | H04L 41/0609 |

* cited by examiner

ALARM PRIORITIZATION IN A 5G TELCO NETWORK

RELATED APPLICATIONS

Benefit is claimed under 35 U.S.C. 119(a)-(d) to Foreign Application Serial No. 201941053700 filed in India entitled "ALARM PRIORITIZATION IN A 5G TELCO NETWORK", on Dec. 24, 2019, by VMWARE, Inc., which is herein incorporated in its entirety by reference for all purposes.

CROSS-REFERENCE TO RELATED APPLICATION

The present application is related in subject matter to U.S. patent application Ser. No. 16/792,320, which is incorporated herein by reference.

BACKGROUND

Enterprises of all types rely on networked clouds and datacenters to provide content to employees and customers alike. Telco networks are being expanded to enterprise use with the unveiling of 5G technology. The network can be segregated virtually, allowing many different tenants and users to share the underlying infrastructure. Network function virtualization ("NFV") relies on the physical and virtual layers and requires constant adaptation to meet data availability needs. Using NFV in the Telco cloud, network providers are able to quickly deliver new capabilities and configurations for various business and competitive advantages. This virtualization has led to more data availability than ever before, with even more promised based on widespread 5G technology adoption.

However, preventing downtime becomes more difficult than ever in this environment. Network administrators are armed with various tools for monitoring network health. But with the complexity of a shared Telco network, it can be difficult or impossible for a network administrator to know which problems should be fixed first. There can be hundreds or thousands of problems at any given time. This is further complicated by multiple tenants, using the same network infrastructure. Tenants can be different companies with different use cases for the network. The network provider can effectively lease portions of the network to different tenants, such as by using network slices. Because the network infrastructure is shared between the tenants, it can be difficult to discern which tenants are impacted by which problems, which can prevent administrators from prioritizing fixes for particular tenants.

Downtimes can result in huge financial losses. However, some problems are more costly than others. Currently, it is very difficult to determine which problems are most urgent from a business cost standpoint. Even though some information technology ("IT") operational tools provide analytics and loop-back policies for analyzing virtual infrastructure, visibility into the interactions between physical and virtual networking components is still not enough to determine the costliest problems. For example, a physical hardware problem can impact virtual network functions ("VNFs") that rely on that problem, which in turn can impact services for particular tenants. But there is no easy way to quickly determine that the underlying problem should be prioritized based on the degraded services that result. Widespread data availability will only increase the need to rapidly detect and prioritize problems for remediation.

As a result, a need exists for prioritizing problems in a 5G Telco network.

SUMMARY

Examples described herein include systems and methods for prioritizing problems in a Telco network. In one example, a prioritization engine can receive problem notifications from one or more components in the network. This can include receiving root cause analysis ("RCA") information from an analytics engine that correlates a problem between multiple network resources. These resources can span virtual, physical, and service layers of the network. For example, a problem at a physical hardware device, such as a server, can impact a virtual entity, such as a VNF, that runs on that hardware device. Similarly, a service that relies on the VNF can also be affected. The analytics engine can generate problem notifications that indicate the impacted resources, such as based on which symptoms led to the problem in the first place. The problem notification can identify a root-cause problem and impacted network resources for an observed set of symptoms.

A prioritization engine can receive the problem notifications and attempt to prioritize them for remediation purposes. This can allow an administrator or even an automated process to know which problems to address first. When there are hundreds or thousands of problems in a dynamically changing network, the administrator needs to know which problems are most important for their business. For the purposes of this disclosure, the administrator can be a user or, alternatively, can be an automated process or service.

In one example, the prioritization engine constructs a mapping matrix that maps network resource types to problem weights. The mapping matrix can be one or more tables of data, in an example. The network resource types can include, for example, a physical device, physical entity, physical degradation, virtual device, virtual entity, virtual degradation, service, and service degradation. Any of these network resource types can correspond to symptoms for a problem, such as lack of memory at a physical device or failure of a virtual entity such as a VNF. Additionally, different numbers or divisions of network resource types can be defined in the mapping matrix.

Each resource type in the mapping matrix can be assigned a weight. The mapping matrix weights (also called problem weights) can be based on both the resource type and also a class of service in an example. Classes of service can be used to prioritize certain tenants over others. For example, a gold level tenant can be more important or otherwise prioritized above a silver level tenant. To reflect this, classes of service can correspond to different weight multipliers. These multipliers can be applied to the weight value for a component type, yielding an overall mapping matrix weight. This can be accomplished with a different row in the mapping matrix for each class of service, in an example. Alternatively, the class of service multiplier can be separately applied to a mapping matrix weight after the mapping matrix weight is retrieved, in an example.

The prioritization engine can use the mapping matrix to create a problem-impact ("PI") matrix. When a problem notification is received, the prioritization engine can create vertices for the network resources identified as symptoms for that problem. These vertices can be assigned weights from the mapping matrix based on the symptoms of that problem. For example, a table can be created in which one dimension corresponds to problems and another dimension corresponds to impacted network resources. The network resources can report symptoms that form the basis of the problem notifications from which the PI matrix is built. In one example, the impacted network resources act as vertices that also have edges between them. The edges can be assigned impact weights determined based on the mapping matrix, such as by using the type of impacted network resource to lookup the corresponding mapping matrix weight. The retrieved mapping matrix weight can be further manipulated as well, such that each edge is assigned a percentage of overall impact on the problem.

As part of prioritizing the problems, the prioritization engine can sum impact weights per problem. The prioritization engine can then prioritize the problems based on which problems have the highest summed impact weight. The prioritization engine can then prioritize alerts corresponding to those problems on a graphical user interface ("GUI"). This can allow an administrative user or administrative process to know which problems to address first. Because remedies can take time, addressing the most important problems first can ensure that critical issues are not left languishing.

In another example, the impact weights are used to determine the highest cost problem and problems are prioritized according to cost. This can include tracking historical hourly costs for fixing problem types and multiplying the summed impact weights by the hourly cost. Then, the highest priced problems can be prioritized first. A cost-based priority list can be separately displayed on a GUI, in an example, or retrieved for viewing by a management user.

The method can be performed as part of a system that includes one or more physical servers having physical processors. The processors can execute instructions to perform the method. In one example, the instructions are read from a non-transitory, computer-readable medium. The machine learning engine can then execute as part of an SDDC topology. For example, the machine-learning engine can be configured to receive inputs from various analytics applications that supply KPIs from the virtual layer or fault information from the physical layer. Then the machine learning engine can interact with an orchestrator or some other process that can take corrective actions based on the findings of the machine learning engine.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

In one example, a prioritization engine can prioritize problems being reported from various components in a Telco network. The problem notification can indicate a network resource from which the problem originates. The problem notification can also indicate impacted network resources. Network resources can be part of the physical, virtual, or service layers of the network. For example, virtual components can include virtual controllers, virtual routers, virtual interfaces, virtual local area networks ("VLANs"), host VMs, or other virtualized network functions. They can rely on one or more virtual entities, such as VMs, hypervisors, apps, or guest operating systems. Physical components can include physical devices, such as controllers, routers, switches, or servers. Physical components can be parts of those physical devices, such as interfaces, memory, processors, and the like.

The prioritization engine can maintain a mapping matrix used to weight different problems based on the type of network components that are impacted. Each network resource type can correspond to a problem weight, in an example. The mapping matrix can also accommodate different service level types, such as providing multipliers or different rows of weights based on which service level tenant is impacted by the problem.

Weights can be retrieved from the mapping matrix for the impacted network resources for each problem. For example, a first problem notification can indicate first and second network resources as symptoms for the problem, while a second problem indicates third and fourth network resources. These network resources can be looked up, with the impacted tenant considered for each resource and symptom, in an example. Then the weights can be retrieved and summed. This can include summing weights for the first and second network resources to determine a summed impact weight of the first problem. Likewise, the summed impact weight of the second problem can be determined based on the weights of the third and fourth network resources. Then, the problem with the highest summed impact weight can be prioritized first. This can include displaying the prioritized list on a GUI, in an example.

Figure 1:
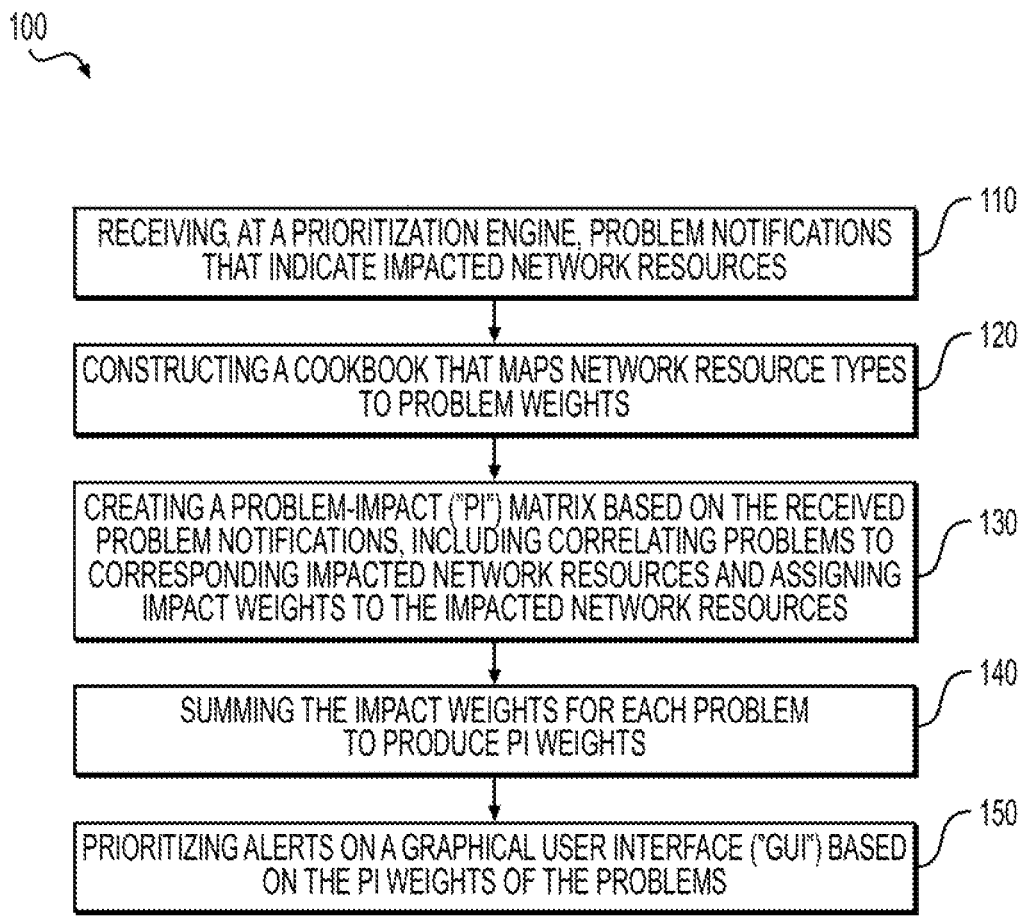
FIG. 1 is a flowchart of an example method for problem prioritization in a Telco cloud.

FIG. 1 is an example flowchart of steps performed by a system for prioritization of problems or alerts in a Telco NFV cloud. The Telco cloud can be one type of distributed network, in which network functions are located at different geographic locations. These locations can be different clouds, such as an edge cloud near a user device and core clouds where various analytics engines can execute.

At stage 110, the prioritization engine can receive problem notifications. A problem notification can be created from an analytics engine that receives key performance indicators ("KPIs") or alerts from network components. The network components can be in a virtual layer, such as a VNF, a physical layer, such as a server, or in a services layer, such as an application or middleware. In one example, the analytics engine can operate separately and remotely from the prioritization engine. Alternatively, the analytics engine can be part of the prioritization engine and can receive multiple symptoms to create a problem notification. These engines can be applications or VMs executing on a physical device, such as a server.

The analytics engine can combine alerts from the virtual layer, physical layer, and service layers to issue a notification. The notification can include symptoms that arise in one or more of those layers. The analytics engine can generate the notifications based on a model. The model can define which KPIs, faults, and thresholds are used to determine a potential problem. These criteria can be reported as symptoms in the notification. For example, symptoms can be selected based on spatial analysis that links events at the virtual component and the physical component. The symptoms can include dynamic KPI thresholds.

To link information from different network layers, the analytics engine can use a topology of mapping services. These can associate the virtual components to hardware components on which they run. Similarly, services can be tied to virtual components that they utilize. In one example, this mapping is accomplished by maintaining a graph database in which the nodes (objects) represent virtual and physical components. Edges between the nodes can represent relationships. In this way, a graph database can, for example, link VNFs to particular hardware. The graph database can allow the analytics engine to more accurately correlate the KPIs and fault information and issue problem notifications with the correct symptomology. The topology represented by the graph database can continually and dynamically evolve based on a data collector framework and discovery process that creates the topology based on what is running in the Telco cloud. The discovery process can account for both physical and virtual components. Network resources can be mapped together and identified in symptomology for a problem.

In one example, the prioritization engine can run as part of an orchestrator process. The problem notification can notify an orchestrator to perform a corrective action, such as re-instantiate a VNF or message a service about a failing physical device. But the prioritization engine can prioritize the alerts such that the orchestrator handles the most important alerts first. Based on the alert, the orchestrator can cause a corrective action to be performed on the virtual or physical component implicated by the alert. An alert object can include information about the source of the alert, the type of alert, and the severity of the alert. In one example, an alert object can contain identifying information regarding the network resources to which the alert relates. For a virtual component, the identifying information can include a unique string that corresponds to a particular VNF. For a hardware device, the alert can identify a physical entity, such as a rack, shelf, card, and port.

At stage 120, the prioritization engine can construct and access a mapping matrix that maps types of network resources to problem weights. The mapping matrix can be a table that includes a first dimension for the resource types. A second dimension can represent classes of service, in an example. This can allow for different weights of the same resource type for different classes of service. Different tenants can correspond to different classes of service, for example, based on their service level agreement ("SLA"). An example mapping matrix is provided below in Table 1.

TABLE 1

Example Mapping Matrix

| Class of Service | Physical Device | Physical entity | Physical degradation | Virtual Device | Virtual Entity | Virtual degradation | Services | Service degradation |
|---|---|---|---|---|---|---|---|---|
| Platinum(P) | Vp*Wpd | Vp*Wpe | Vp*Wpde | Vp*Wvd | Vp*Wve | Vp*Wvde | Vp*Ws | Vp*Wpde |
| Gold(G) | Vg*Wpd | Vg*Wpe | Vg*Wpde | Vg*Wvd | Vg*Wve | Vg*Wvde | Vg*Ws | Vg*Wsde |
| Silver(S) | Vs*Wpd | Vs*Wpe | Vs*Wpde | Vs*Wvd | Vs*Wve | Vs*Wvde | Vs*Ws | Vs*Wsde |

In the above example, the mapping matrix includes three classes of service, Platinum, Gold, and Silver. These can include corresponding multipliers, such as $V_p=100$, $V_g=75$, and $V_s=50$. Similarly, the W variable can represent the weight of a particular resource type. For example, a physical device can have $W_{pd}=0.9$. A physical entity can have $W_{pe}=0.5$. Other example weights can include $W_{pde}=0.7$, $W_{vd}=0.9$, $W_{ve}=0.5$, $W_{vde}=0.6$, $W_s=0.8$, and $W_{sde}=0.6$.

These values and weights can differ. In one example, the mapping matrix is predefined to include the weights for the different resource types and multipliers for the classes of service. These weights can then be updated, such as by assigning different values to different classes of service or changing the weights of the resource types. The different values for classes of service can be based on SLAs. The administrator can use a GUI in one example to update class of service multipliers or resource type weights. In one example, the GUI can also provide options to create new classes of service and assign particular tenants to classes of service. In one example, the resource type weights can also be updated based on which past problems are considered the highest priority. For example, based on which problems are remediated first in a list of available problems, an algorithm can recognize those problems as most important to an administrator. Then, the resource types involved in the problem can receive increased weights.

In another example, the analytics engine can provide the weights for the mapping matrix table based on correlations between the different resource types. In another example, the mapping matrix can include specific resources as resource types. This can be beneficial when certain resources are disproportionately important to the provider's business operation or to operation of the network itself. Machine learning can tune the weights and values over time, in an example.

Based on the example values ("V") and weights ("W") presented above in conjunction with Table 1, problem weights can be determined as shown in Table 2, below.

TABLE 2

Example Mapping Matrix with Problem Weights

| Class of Service | Physical Device | Physical entity | Physical degradation | Virtual Device | Virtual Entity | Virtual degradation | Services | Service degradation |
|---|---|---|---|---|---|---|---|---|
| T1 (P) | 90 | 50 | 70 | 90 | 50 | 60 | 80 | 60 |
| T2 (G) | 67.5 | 37.5 | 52.5 | 67.5 | 37.5 | 45 | 60 | 45 |
| T3 (S) | 45 | 25 | 35 | 45 | 25 | 30 | 40 | 30 |

At stage 130, the prioritization engine can use the mapping matrix to create a problem-impact ("PI") matrix. The PI matrix can include problems that are linked to corresponding impacted network resources. The impacted network resources can be identified from the problem notifications, in an example. For example, an analytics engine can use the network topology to create problem notifications when certain combinations of network resources report KPIs or alerts in combinations. These can be the symptoms of the problem. The symptoms can also be used to identify the impacted network resources, in an example.

The PI matrix can be created as one or more tables or graphs, depending on the example. In one example, a graph of nodes and edges can be created. Each node, also called a vertex, can represent a network resource. For example, if a problem is reported, the problem itself (or the reporting network resource) can be one node and the impacted network resource to the overall problem. This can include dividing the impact weight by the sum of the problem weight and the impact weight.

In another example, the PI matrix can be implemented in a table. For example, the table can include a first dimension for problems and a second dimension for impacted network resources. For instances where a problem impacts a network component, the problem weight from the problem table can be used as the impact weight for that instance. The resulting table can then be used to sum impact weights at stage 140, allowing for an overall PI weight for each problem. The problems with the highest PI weights can then be prioritized first.

As an example, an alarm prioritization table can be created based on four problem notifications received by the prioritization engine. An example alarm prioritization table can be one type of PI matrix and is shown below as Table 3.

TABLE 3

Example PI matrix

| | I1 (R4:S1) | I2 (R2:S3) | I3 (R10:S2) | I4 (R5:S1) | I5 (R11:S1) | I6 (R11:S2) | I7 (R5:S3) | I8 (R9:S8) | I9 (R1:S2) | I10 (R3:S4) | I11 (R6:S9) | I12 (R2:S3) |
|---|---|---|---|---|---|---|---|---|---|---|---|---|
| P1 | 1 | 1 | 1 | 1 | 0 | 0 | 0 | 0 | 0 | 0 | 0 | 0 |
| P2 | 0 | 0 | 0 | 0 | 1 | 1 | 1 | 0 | 0 | 0 | 0 | 0 |
| P3 | 0 | 0 | 0 | 1 | 0 | 0 | 1 | 0 | 0 | 0 | 1 | 1 |
| P4 | 0 | 0 | 0 | 0 | 0 | 0 | 0 | 0 | 1 | 1 | 0 | 0 | work resources can be another node. Weights for the impacted network resources can be retrieved from the mapping matrix and used to assign impact weights. For example, the prioritization engine can determine the impact weights for the impacted network resources by looking up the problem weights for the corresponding network resource types.

The correct mapping matrix entry to use can be based on the class of service involved for the symptom. For example, a symptom for a problem can reveal that the problem is limited to a particular tenant. The prioritization engine can then use that tenant's class of service in conjunction with the impacted network resource type to retrieve the weight from the mapping matrix. The vertices can be assigned impact weights in this way. In one example, edge weights can also be determined by determining the proportion of impact of a This PI matrix can be created based on a first problem (P1) impacting resource four (R4) based on a first symptom (S1), resource two (R2) based on a third symptom (S3), resource ten (R10) based on a second symptom (S2), and resource five (R5) based on a first symptom. As shorthand, this problem can be represented as P1→[I1(R4:S1), I2(R2:S3), I3(R10:S2), I4(R5:S1)]. Similar shorthand representations of problems two, three, and four can include:

$P2 \rightarrow [I5(R11:S1), I6(R11:S2), I7(R5:S3)],$ $P3 \rightarrow [I4(R5:S1), I7(R5:S3), I11(R6:S9), I12(R2:S3)],$ and $P4 \rightarrow [I9(R1:S2), I10(R3:S4)].$ The PI matrix can then be populated with impact weights by looking up problem weights in the mapping matrix of Table 2. This can result in the weighted PI matrix of Table 4, below.

TABLE 4

Example PI matrix with impact weights

| | I1 (R4:S1) | I2 (R2:S3) | I3 (R10:S2) | I4 (R5:S1) | I5 (R11:S1) | I6 (R11:S2) | I7 (R5:S3) | I8 (R9:S8) | I9 (R1:S2) | I10 (R3:S4) | I11 (R6:S9) | I12 (R2:S3) |
|---|---|---|---|---|---|---|---|---|---|---|---|---|
| P1 | Vs*Wpd (50*0.9) | Vs*Wpde (50*0.5) | Vg*Wsde (75*0.6) | Vs*Wsde (50*0.6) | 0 | 0 | 0 | 0 | 0 | 0 | 0 | 0 |
| P2 | 0 | 0 | 0 | 0 | Vg*Wve (75*0.5) | Vg*Wvd (75*0.9) | Vs*Ws (50*0.8) | 0 | 0 | 0 | 0 | 0 |
| P3 | Vs*Wpd (50*0.9) | 0 | 0 | Vs*Wsde (50*0.6) | 0 | 0 | Vs*Ws (50*0.8) | 0 | 0 | 0 | Vs*Wve (50*0.5) | Vs*Wpd (50*0.9) |
| P4 | 0 | 0 | 0 | 0 | 0 | 0 | 0 | 0 | Vp*Wvd + Vg*Wvd (75*0.9) + (100*0.9) | Vp*Wpe + Vg*Wpe (75*0.5) + (100*0.5) | 0 | 0 |

To populate the PI matrix of Table 4, the class of service impacted by each problem can be determined. This can be based on the impacted network resource and the corresponding symptom, which can be mapped to one or more tenants. In this example, the tenants (T) can be mapped to the network resources and symptoms as follows:

```
Physical - R1 R3 R4 R2      T1 (P) - R1, R3, R7, R11, R9, R8
Virtual - R7, R8, R11, R6   T2 (G) - R1, R3, R7, R11, R4, R5, R10
Services - R9, R5, R10      T3 (S) - R2, R4, R6, R5, R10
```

The corresponding problem weights can then be retrieved from the mapping matrix of Table 2 to populate the impacts of Table 4.

At stage 140, the prioritization engine can, for each problem, sum the impact weights of the impacted network components. The prioritization engine can prioritize the problems based on which ones have the higher relative summed weights (also called the PI weights). This can include summing the edge weights of a PI matrix in graph form. Alternatively, it can include summing the rows of impacts in a table, such as that of Table 4. Continuing with the Table 4 example, the summed impact weights (PI weights) of the problems can be as follows:

$$P1=(50*0.9)+(50*0.5)+(75*0.6)+(50*0.6)=45+25+45+30=145$$

$$P2=(75*0.5)+(75*0.9)+(50*0.8)=37.5+67.5+40=150$$

$$P3=(50*0.9)+(50*0.6)+(50*0.8)+(50*0.5)+(50*0.9)=45+30+40+25+45=185$$

$$P4=(75*0.9)+(50*0.9)+75*0.5)+(50*0.5)=67.5+45+37.5+25=175$$

This can result in the prioritization engine prioritizing the problems in the order of P3, P4, P2, P1.

At stage 150, the prioritization engine can prioritize the alerts on a GUI based on the summed impact weights of the problems. In one example, this can include sending the prioritized problems to the GUI for display. The GUI can display a list of problems, with the highest problems displayed at the top. Problem priority or the corresponding PI weight can be used to highlight the problems with different colors, in an example. The alerts themselves can graphically illustrate or explain corresponding problems. For example, the alert can indicate a priority score, summarize the problem, and allow the user to expand the problem to drill down on impacted network resources. The alert can also list the impacted tenants, in an example.

In one example, a GUI can prioritize problems based on cost of failure. This can include multiplying estimated downtime against the PI weight.

Figure 2:
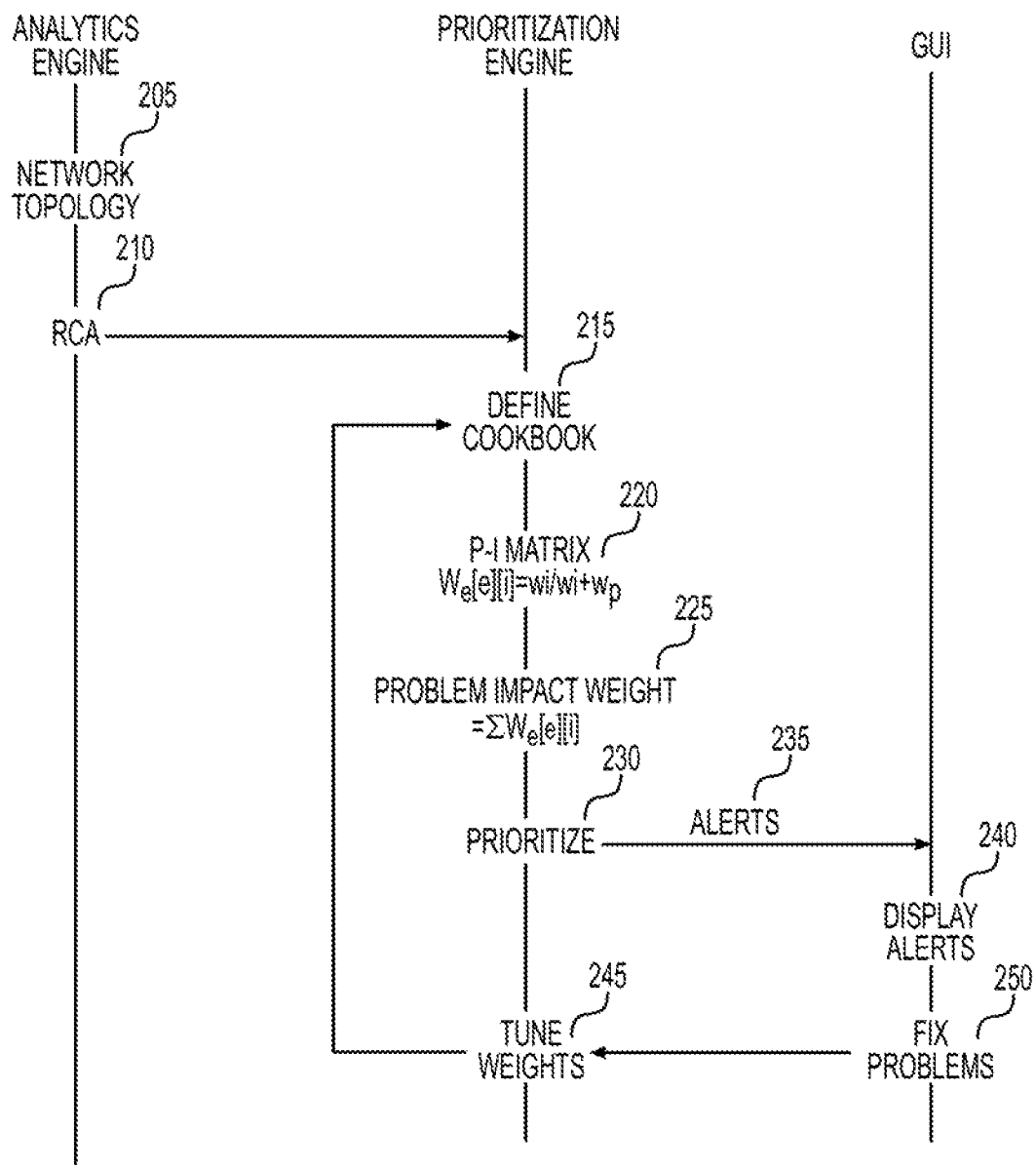
FIG. 2 is a sequence diagram of example steps for problem prioritization in a Telco cloud.

FIG. 2 is an example sequence diagram for prioritizing alerts in a Telco network. At stage 205, an analytics engine can receive KPIs and alerts from network resources in a network topology. The network resources can span different layers of the network, such as the physical layer, virtual layer, and service layer. For example, a KPI related to latency can be received from a virtual router. An alert regarding temperature can be received from a physical server. Additionally, the analytics engine can receive an alert from an application service regarding threshold non-response rate.

At stage 205, the analytics engine can also receive or construct the network topology itself, or at least a portion related to the symptoms of a problem. The network topology can track relationships between network resources. The topology can include a graph of network resources, such as available switches, VNFs, and processes that use both. For example, the hardware in the VSN can report which VNFs are running on which devices and which switches are in communication with one another. By discovering both the hardware and virtual components, the system can map these together to create the topology. This can be created by the analytics engine itself, which can include one or more processes. Alternatively, an outside process can create the topology and send it to the analytics engine.

At stage 210, the analytics engine can perform RCA to determine a problem based on various symptoms and the connections between network resources in the topology. For example, the analytics engine can recognize patterns between reports from various network resources and problems reported at a network resource. This can be the basis of one or more models for recognizing problems and creating problem notifications.

As part of performing RCA, the analytics engine can match symptoms to a model. The right combination of symptoms can lead the analytics engine to generate a problem notification. The problem notification can identify the network resource where the problem occurs and the impacted resources. The problem notification can also indicate which symptoms are present at which impacted resources, in an example. The problem notification can be sent to a prioritization engine, which can be part of an orchestrator process in an example.

The prioritization engine can define a mapping matrix at stage 215. This can include creating a table with network resource types as one dimension and classes of service as a second dimension. Weights can be determined that correspond to the different network resource types in an example. The problem weights can be calculated by multiplying the component type weights by class of service values in an example. For example, the highest priority class can have a value of 1, whereas a lower priority class can have a value of 0.5.

The mapping matrix can be stored in any non-transitory, computer-readable storage medium that is accessible to the prioritization engine. In one example, the problem weights can update based on administrative input or based on which problems are remedied first.

At stage 220, the prioritization engine can construct a PI matrix. The PI matrix can take the form of a graph or a multi-dimensional table. In one example, the edges are assigned weights based on the proportion of the impact weight to the overall problem weight. For example, the edge weight ($w_{E(i,j)}$) between two vertices i and j (v(i) and v(j)) can be calculated as shown in Equation 1, below.

$$W_{E(i,j)} = W_{v(j)}/(W_{v(i)} + W_{v(j)}) \quad \text{Equation 1}$$

In Equation 1, $w_{v(i)}$ can be the problem weight of vertex i, retrieved from the mapping matrix. $w_{v(j)}$ likewise can be the problem weight of vertex j, retrieved from the mapping matrix.

In another example, the PI matrix is a table with impacted network resources forming columns and problems forming rows. The impacted network resources that correspond to each problem can be populated with problem weights from the mapping matrix.

At stage 225, the impact weights can be summed to determine a PI weight for each problem. This can include summing the impact weights of the edge weights from a problem vertex in a PI matrix in one example. It can also include summing the impact weights in a row corresponding to a problem in the PI matrix. In general, the PI weight for a problem can be defined as shown in Equation 2, below.

$$W_p = \Sigma_{k=1}^{n} W_I^{(k)} \quad \text{Equation 2}$$

In Equation 2, $W_p$ can be the PI weight, representing the summed impact weight of the problem. $W_I$ can be the impact weight for a particular network resource. The network resources can be numbered between k=1 to n. These impacted network resources can be represented as vertices linked to the problem vertex or as columns in a table, in some examples.

At stage 230, the problems can be prioritized based on which ones have relatively higher PI weights. In cases of a tie, the problem with the most impacts can be prioritized in an example. Then, at stage 235, prioritized alerts can be sent to the GUI for display. The GUI can be part of an orchestrator process in one example. Alternatively, the GUI can be part of the prioritization engine or an application that communicates with the prioritization engine. The GUI can be part of an administrative console that allows the administrator to investigate problems in the network. The GUI can display the prioritized alerts at stage 240. This can include listing the alerts based on problem priority, such as with the highest priority problems above lower priority problems in a list. Critical problems, such as those based on overall PI score being above a threshold, can be highlighted a different color.

The administrator or orchestrator process can fix problems at stage 250. In one example, problems automatically clear when the symptoms disappear. In another example, the administrator can mark problems as fixed in the GUI. Based on administrator input, the prioritization can further tune weights of the mapping matrix at stage 245. For example, the administrator can select options on the GUI to indicate that a problem should be prioritized higher. The prioritization engine can recognize patterns in such selections. For example, the prioritization engine can recognize that the administrator selections would be satisfied more often if certain resource types were weighted higher and others lower. These problem weights can then be automatically adjusted in the mapping matrix at stage 245.

Figure 3:
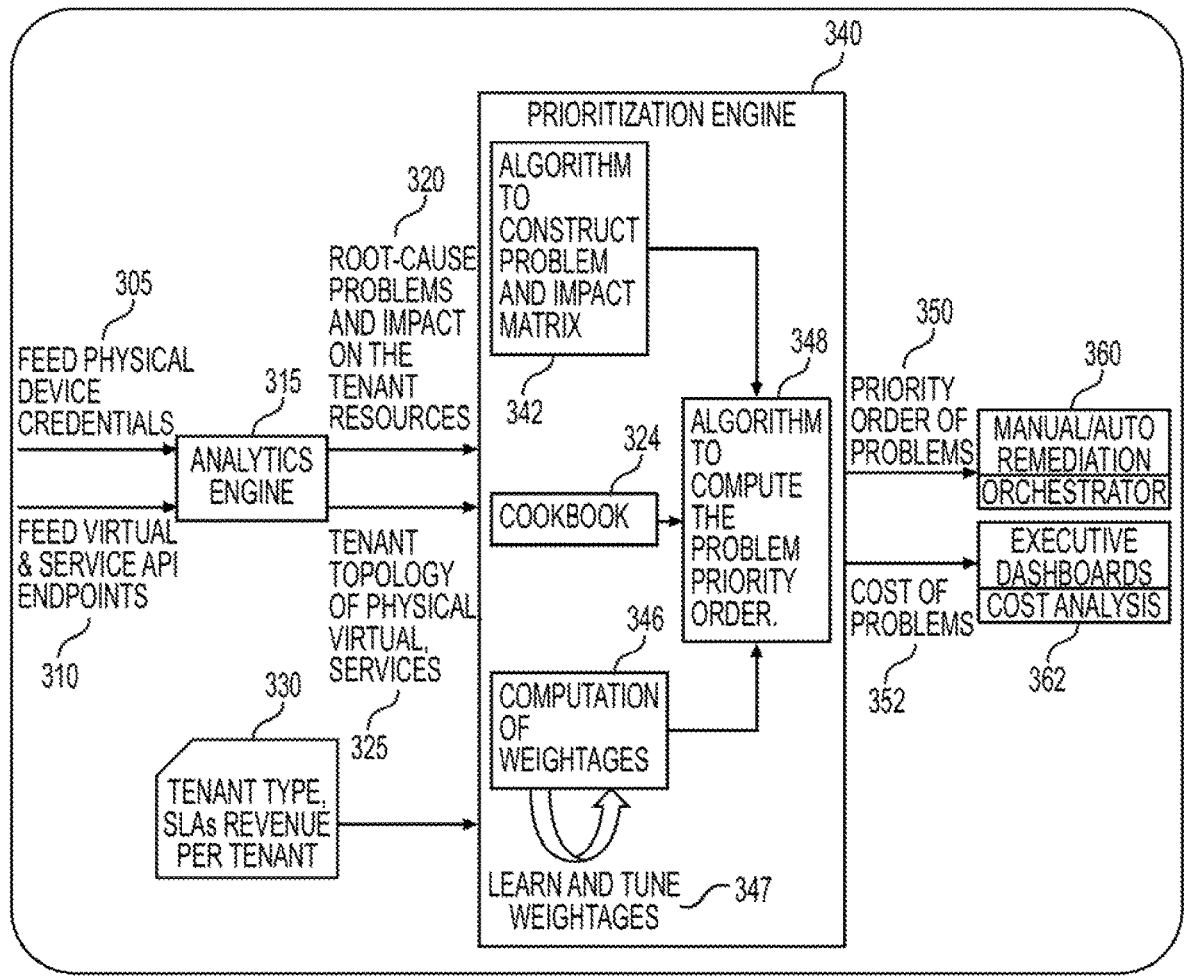
FIG. 3 is an example system diagram including components for self-aware service assurance in a Telco network.

FIG. 3 is an example diagram of system components and related stages for prioritizing problems in a Telco network. An analytics engine 315 can receive physical device credentials at stage 305 and virtual and service endpoints at stage 310. The physical device credentials can identify devices and their locations in the network. For example, an internet protocol (IP) address for the device can be included. The virtual and service endpoints can identify network resources in the virtual and service layers of the network. These layers can run on top of the physical layer, which is made up of the physical devices. The physical, virtual, and service resources can report operational characteristics, such as through use of an application programming interface ("API"). This can allow the analytics engine to receive KPIs, alarms, and operational states. From that information, the analytics engine can detect problems based on RCA. This can include identifying symptoms of problems, which can impact other network resources in addition to the network resource where the root-cause problem exists.

At stage 320, the analytics engine 315 can send a problem notification to the prioritization engine 340. The problem notification can identify the network resource with the root-cause problem and the other impacted resources. The impacted resources can each have a resource type that can be matched against a mapping matrix 324. The impacted resources can be identified along with symptoms. The symptoms can be codes that can be matched against particular tenants in combination with the network resource, in an example.

The analytics engine 315 can also provide the topology of network resources to the prioritization engine at stage 325, in an example. In one example, this can include only providing the topology that is relevant for the problems sent over at stage 320. For example, if a root cause problem is at a first network resource, then the topology of vertices connecting to the first network resource can be provided at stage 325. The provided topology can be multiple connection levels deep. Similarly, if a batch of fifteen problems are provided at stage 320, then the topology of vertices that connect back to any of those fifteen problems can be provided.

The prioritization engine 340 can be one or more processes that run on the network. In one example, the prioritization engine 340 runs as a module of the analytics engine 315. Alternatively, it can run as part of an orchestrator suite or process.

The prioritization engine can construct a mapping matrix 324 that includes problem weights for different network resource types. Those weights can be computed at stage 346 based on defaults set by an administrator. For example, the administrator can set both the weights of network resource types and values for classes of service. The interaction between the classes of service and a network resource type can result in a problem weight, in an example. However, the problem weights can be learned and tuned at stage 347. This can happen repeatedly and continuously, in an example. A machine learning algorithm can recognize over time that certain combinations of network resource types or classes of service cause major impacts throughout the network and should be prioritized for fixing. Alternatively, choices made by administrators regarding which problems are actually remediated first can be used for weighting resource types differently to prioritize similar problems.

The prioritization engine 340 can execute a first algorithm 342 to construct a PI matrix. The PI matrix can be one or more trees, graphs, or tables. The PI matrix can link impacted network resources to a problem. The first algorithm 342 can assign impact weights to these links. The impact weights can be based on the problem weights of the mapping matrix 324. For example, a network resource type used by a particular tenant can allow the first algorithm 342 to identify a corresponding problem weight in the mapping matrix 324. That can then become the impact weight in the PI matrix, or some average of that impact weight with regard to the overall problem weight can be assigned as the impact weight.

The prioritization engine 340 can then execute a second algorithm 348 to determine problem priority order. The second algorithm 348 can, in an example, be further stages of the first algorithm 342. To compute the priority, the second algorithm 348 can sum the impact weights for each problem. A summed impact weight is referred to as a PI weight. Each problem, therefore, can receive a PI weight, in an example. The PI weights can then be compared. The second algorithm 348 can prioritize the problems with the highest PI weights first.

At stage 350, the prioritization engine 340 can send the prioritized problems to a remediation platform 360, such as at an orchestrator. The remediation platform 360 can include a GUI that allows an administrator to review the prioritized problems (also called alerts). In one example, remediation is automatic. Certain problems can be addressed programmatically. For example, a new VM can be instantiated or a service can be restarted. Other problems can be manually handled by an administrator.

At stage 352, the prioritization engine 340 can send a cost-based prioritized list of problems to an executive dashboard 362. This can allow executives to perform cost analysis and coordinate with administrators regarding the prioritization of remediation. In one example, the PI weights of the problems are multiplied against predicted downtime costs for the problems. The results can be used to prioritize the problems based on cost.

Figure 4:
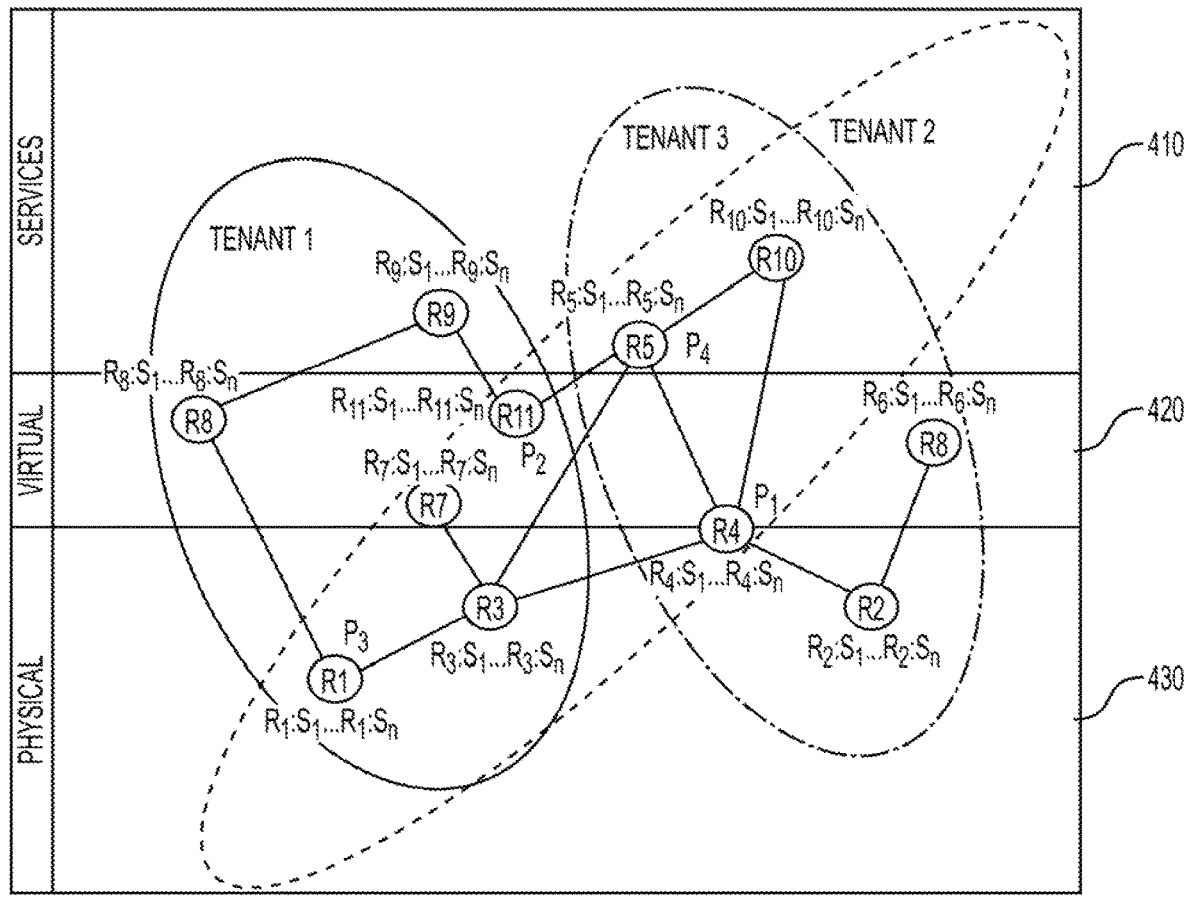
FIG. 4 is an example graph of relationships between network components.

FIG. 4 is an example illustration of a network topology that can be used in determining resource types and impacts between network resources. The network can be segregated into layers, such as a physical layer 430, virtual layer 420, and services layer 410. In turn, the network resource types can correspond to the layers 410, 420, 430. For example, a physical device and physical entity can be a resource type from the physical layer 430. Physical degradation notices are also a resource type that can correspond to the physical layer 430. The virtual layer 420 can include virtual devices, virtual entities, and virtual degradation. The services layer 410 can include services and service degradation.

In this example, the topology can map tenants to network resources (R) and symptoms (S). For example, Tenant 1 can include R1, R3, R7, R8, R9, and R11. These are network resources spanning the physical layer 430 (R1 and R3), virtual layer 420 (R7, R8, and R11), and the services layer (R9). Additionally, the resources R can be assigned to specific symptoms S. This can allow for segregating the topology according to tenant based on which symptoms are relevant to which tenant, in an example. Continuing with FIG. 4, Tenant 2 can include R1, R3, R4, R5, R7, R10, and R11. Again, this can be with regard to specific symptoms for each resource R, in an example. Tenant 3 can utilize R2, R4, R5, R8, and R10.

The resources R themselves can be linked together to form the topology. This can allow the analytics engine to determine impacts, in an example.

As an example, the topology shows a first problem P1 occurring at R4, as second problem P2 at R11, a third problem P3 at R1, and a fourth problem P4 at R5. These problems P1-P4 can be analyzed with respect to example Tables 2, 3, and 4 above. Turning back to Table 3, the first problem (P1) can include four impacts, at R4:S1, R2:S3, R10:S2, and R5:S1. The corresponding impact weights can be determined based on the mapping matrix, such as in Table 1. For example, S1 at R4 can correspond to Tenant 3, which has silver level class of service. R4 can correspond to a physical device, such as a server. Looking up the silver level class of service and physical device resource type in the mapping matrix can result in retrieving a problem value of 45. Similar mapping matrix lookups can result in the values of Table 4, representing an example PI matrix with impact weights. Those impact weights can then be summed across problem rows to determine PI weights and prioritize the problems accordingly.

Some network resources and symptoms can apply to multiple tenants at once. For example, P4 in the above example of Tables 1-4 includes impacts at R1:S2 and R3:S4. These can impact both of Tenants 1 and 2. As a result, the impacts in Table 4 for those resources can include summing the impacts on both Tenants 1 and 2.

Figure 5:
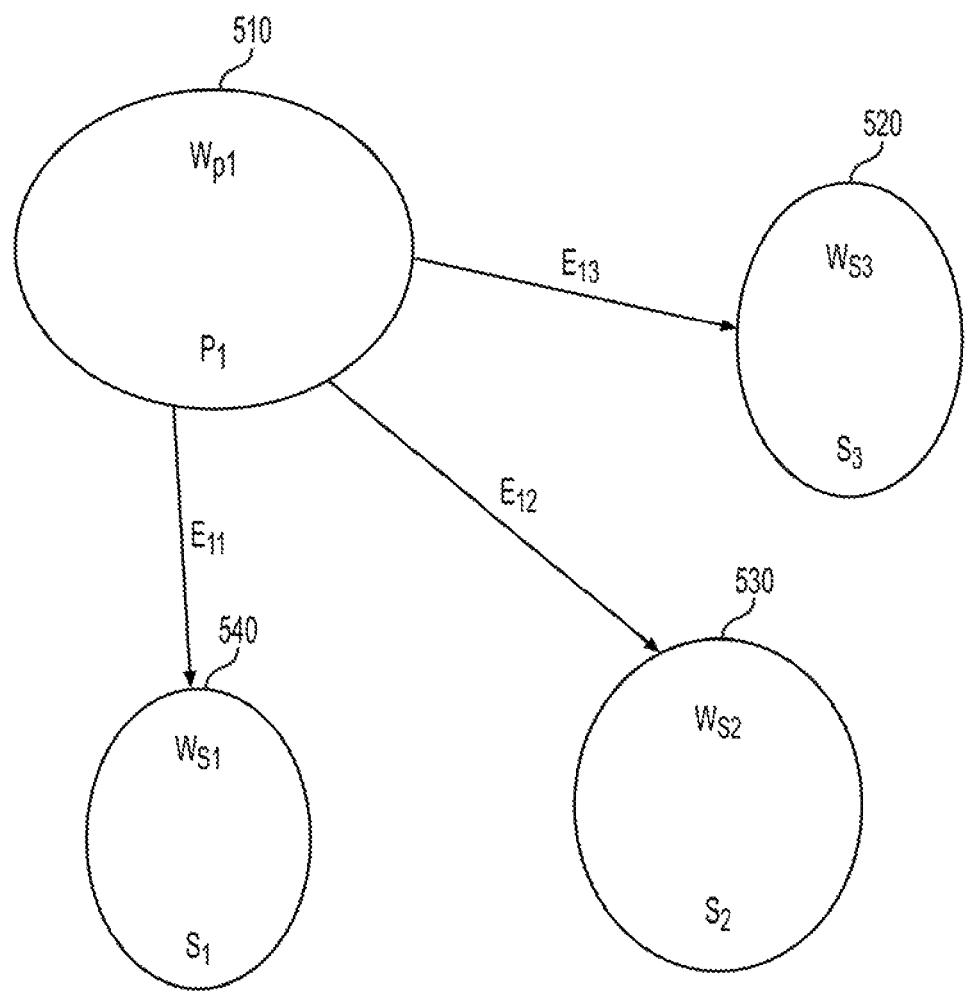
FIG. 5 is an example graph of relationships in a problem-impact matrix.

FIG. 5 shows an example PI matrix in the form of a graph. Vertex 510 can correspond to a problem. $W_{P1}$ can correspond to a PI weight that needs to be solved for the first problem (P1). Impacted resources can be represented as vertices 520, 530, 540. In this example, vertex 520 can be for a first impacted resource with symptom S3. Vertex 530 can represent a second impacted resource with symptom S2. And vertex 540 can represent a third impacted resource with symptom S1. The weights (W) of vertices 520, 530, 540 can be retrieved from the mapping matrix in an example and used as impact weights. Alternatively, impact weights can be calculated as edge weights for edges $E_{11}$, $E_{12}$, $E_{13}$. In one example, edge weights can be calculated using Equation 1, above. For example, $w_{E11} = w_{v(S1)}/(w_{v(P1)} + w_{v(S1)})$. This can yield an impact proportion on the problem as an edge weight.

Figure 6:
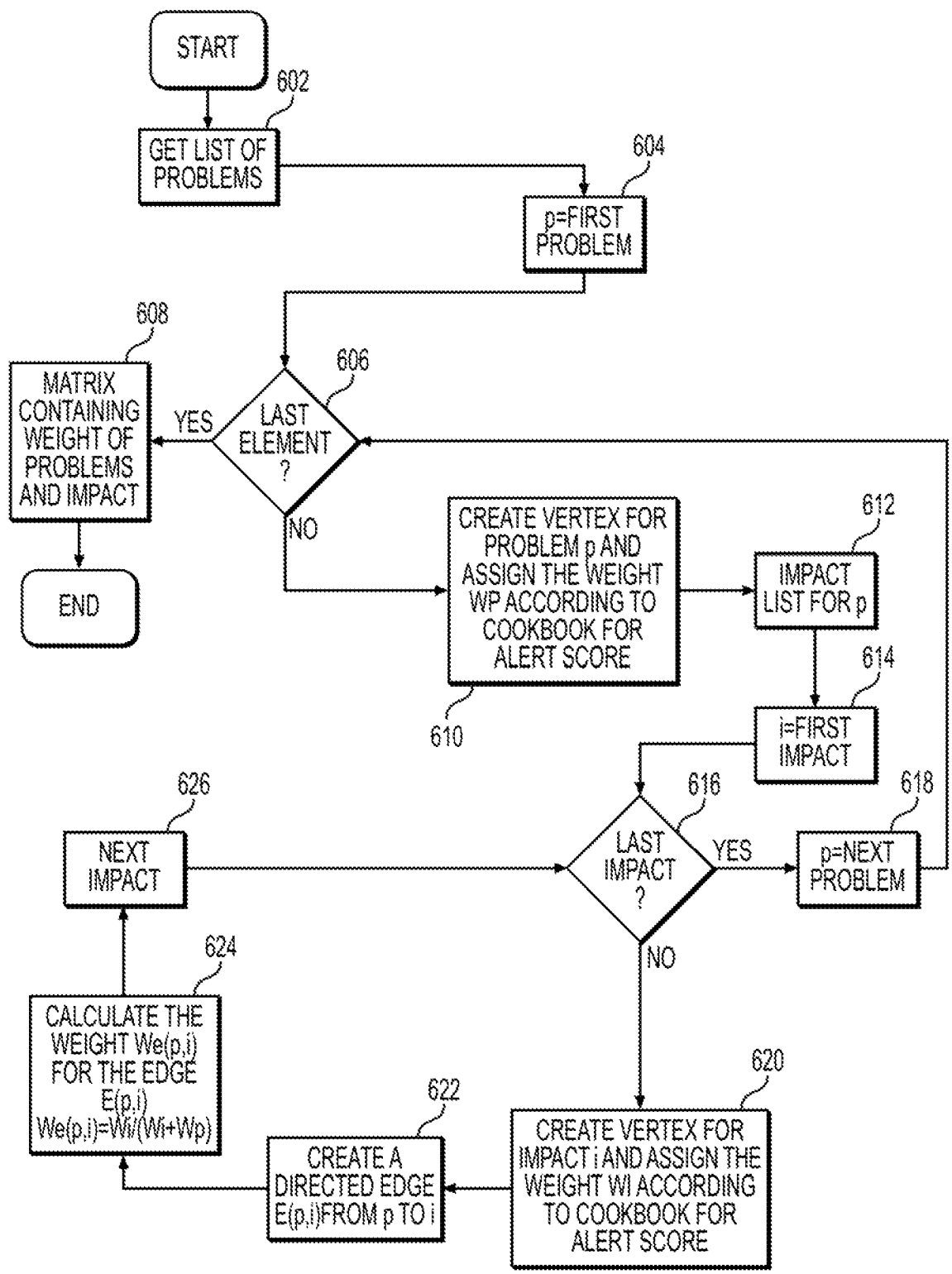
FIG. 6 is a flowchart of an example method for determining impact weights for edges of a problem-impact matrix.

FIG. 6 is an example illustration of a flow chart for determining impact weights in a PI matrix. For example, the first algorithm 342 of FIG. 3 can execute the stages in an example. At stage 602, the prioritization engine 340 can get a set of problems. The set can populate based on problem notifications received from the analytics engine 315. Problems that have not yet received a PI score for prioritization can remain in the set.

At stage 604, the first problem from the set can be retrieved as current problem P. At stage 606, the algorithm can determine if the last element has already been addressed. If not, then the prioritization engine 340 can create a vertex for the problem P at stage 610. The vertex can be a node in a graph. Alternatively, it can be a row in a table. The vertex can be assigned a weight based on the mapping matrix for the network resource type where the root-cause problem occurred. In one example, this means that the network resource reporting the problem can be used to look up the problem weight. The problem weight for that problem can be assigned to the vertex. In another example, a separate mapping matrix table for root-cause problems can be maintained, allowing for weighting an identified problem higher or lower based on prior weight tuning.

At stage 612, the prioritization engine 340 can retrieve a set of impacts that correspond to the problem. The impacted network resources can be determined from the problem notification itself, in an example. For example, the problem can include symptoms that correspond to impacted network resources. A first impacted resource (i) is retrieved from the set at stage 614. If no more impacted network resources exist, then the next problem from the problem set is addressed at stage 618. Otherwise, at stage 620, a vertex can be created for the impacted network resource (i). A weight is assigned to the vertex from the mapping matrix based on the resource type impacted. The lookup can also be based on the symptom itself, which can inform which tenant is impacted.

At stage 622, an edge can be created from the problem vertex to the impact vertex. An impact weight can be calculated for the edge at stage 624. This can be calculated as a proportion of the impact on the overall problem. For example, Equation 1 can be used to calculate the impact weight for the edge as $w_{E(p,i)} = w_i/(w_i+w_p)$. In this example, $w_i$ represents the weight of the impacted network resource and $w_p$ represents the weight of the root-cause network resource. Alternatively, $w_{E(p,i)}$ or the problem weight for the impact vertex can be stored in a table. The cell containing the impact weight can be the intersection of the problem row with the impact column.

At stage 626, the next impact from the set of impacts can be retrieved. This process of creating vertices and edges can continue until the last impact has been addressed at stage 616. When all of the problems have been addressed at stage 606, the PI matrix is completed at stage 608.

Figure 7:
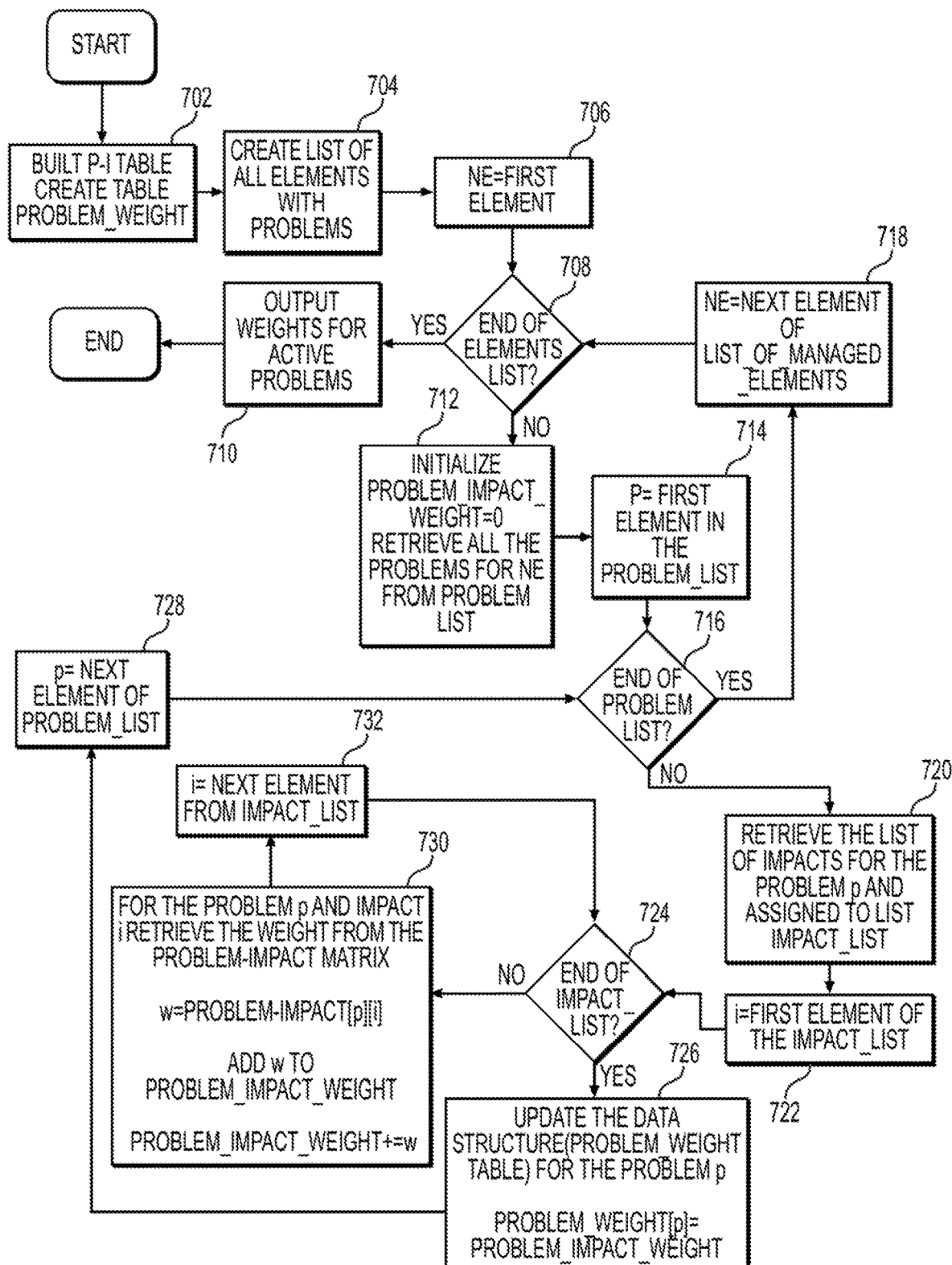
FIG. 7 is a flowchart of an example method for determining problem priority based on the problem-impact matrix.

FIG. 7 is an example illustration of a flow chart for determining priority order of problems from a PI matrix. For example, the second algorithm 348 of FIG. 3 can follow similar steps in an example. At stage 702, the prioritization engine 340 can build the PI matrix, such as outlined in FIG. 6. A table or column for the overall PI weight of each problem can be created.

At stage 704, the prioritization engine 340 can create a list of all network resources having problems. The first network resource can be addressed at stage 706. If the list is not empty at stage 708, then PI weight is initialized at zero at stage 712. The first problem is retrieved at stage 714, which can include retrieving the vertex and connected impacts from the PI matrix. This can include retrieving a row of impact weights corresponding to a problem, in an example.

Until the end of the problem list has been reached at stage 716, the impacts can be retrieved at stage 720. This can include retrieving edge weights or the table values from the problem row. A first impact is retrieved at stage 722 and the impacts are looped through until the impact list is complete at stage 724. The impact weight is then added to the PI weight at stage 730. The next impact is then retrieved at stage 732, and this addition to the PI weight continues until all of the impacts for that problem are addressed at stage 724. The problem is then assigned the total PI weight at stage 726.

The PI weight is then calculated for the other problems until the end of the problem list is reached at stage 716. Then the next network resource of the managed network resources is addressed at stage 718 in this manner. This process can continue until every managed network resource has been addressed at stage 708. Then, the weights for the active problems can be output at stage 710. The problems with the highest PI weights can be prioritized above those with relatively lower PI weights.

The problems can also be prioritized based on estimated cost of failure. For example, Equation 3 below can be used to determine cost of failure.

$$\text{Cost of failure} = (\text{Revenue/total business hours}) * W_{PI} * \text{downtime} \quad \text{Equation 3}$$

As an example, if revenue is $1,000,000 and total business hours are 8,760 (365*24), then the problems from Table 4 can be represented as shown in Table 5 below.

TABLE 5

| Priority | Problem | Cost of failures (1 hr) | Cost of failures (2 hr) |
|---|---|---|---|
| 1 | P3 | $21,090 | $42,180 |
| 2 | P4 | $19,950 | $39,900 |
| 3 | P2 | $17,100 | $34,200 |
| 4 | P1 | $16,530 | $33,060 |

In another example, different estimate downtimes can be assigned to different problems. This can help prioritize the problems differently based on Equation 3 than strictly based on the PI weight for the problems.

Figure 8:
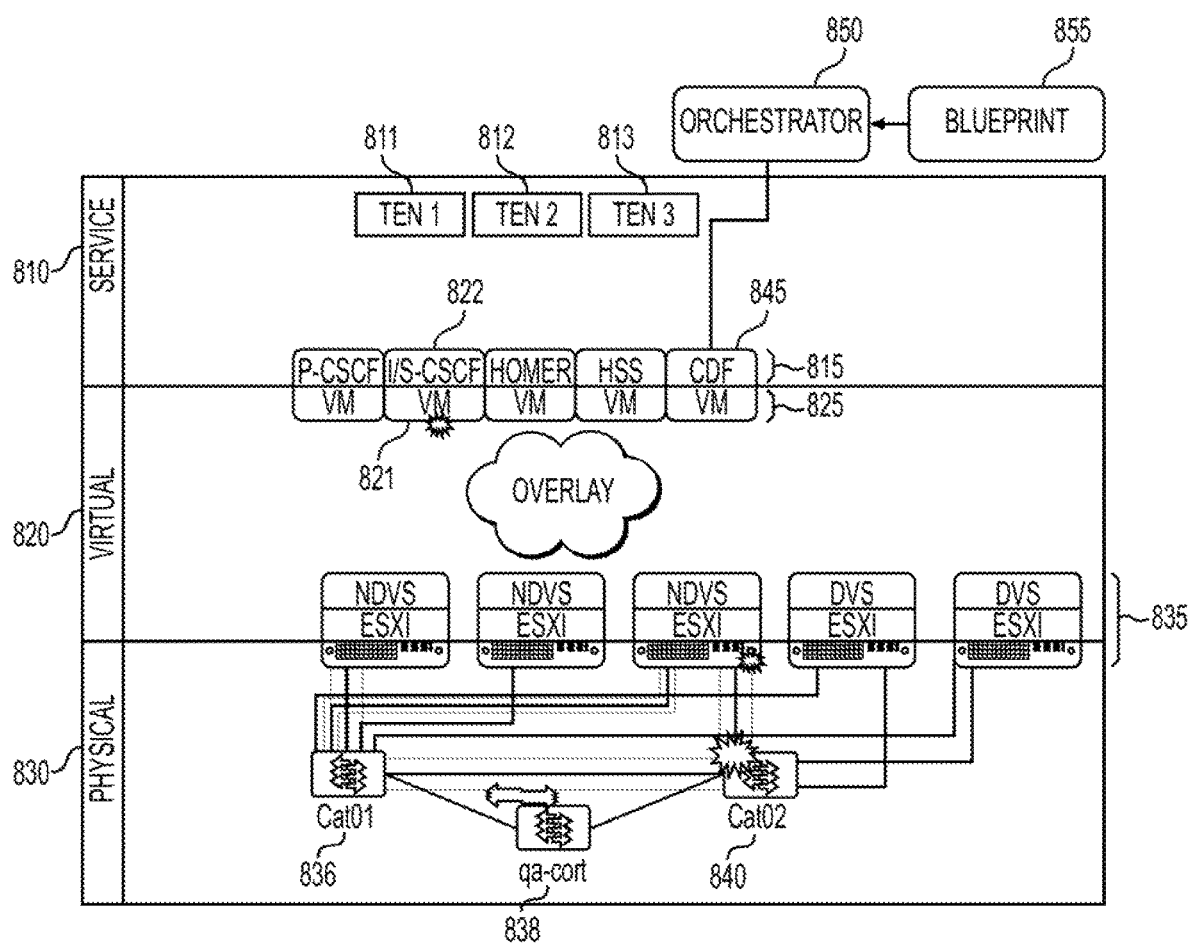
FIG. 8 is an example system diagram including components of a Telco network.

FIG. 8 is an example system diagram showing components that can be used for determining problem priorities in a Telco network. The Telco network can include a physical layer 830, virtual layer 820, and service layer 810. The physical layer can include servers 835, upon which virtual layer 820 network resources can run. The virtual layer can include a virtual overlay upon which virtual resources like VMs 825 and VNFs can run. In this example, the virtual layer also includes virtual switches NDVS and DVS. The virtual switches can run on top of hypervisors ESXI, another type of virtual resource. These virtual resources can all run on top of the physical layer, such as servers 835.

Services 815 can run on the VMs 825. The services 815 can be part of the service layer 810 in an example. These services 815 can serve multiple tenants 811, 812, 813, in an example. For example, the tenants 811, 812, 813 can run various applications on the VMs 825 for any number of purposes.

An orchestrator 850 can monitor network health and be responsible for deploying network resources in the virtual and service layers 820, 810. The orchestrator 850 can do so based on a blueprint 855. The blueprint 855 can describe which network resources to deploy and where, in an example. The orchestrator 850 can be a process that executes as part of the network or separately from the network. In one example, the orchestrator 850 includes the prioritization engine 340. Alternatively, the prioritization engine 340 can run as a service 845 in the network that communicates with the orchestrator 850.

The network resources in the different layers 810, 820, 830 can all be impacted by problems in other layers. For example, the hypervisors and virtual switches (virtual resources) can be impacted by problems at the underlying servers 835. In addition, the virtual switches can impact VM 825 functionality. These in turn can impact how the services 815 run. These problems can run in the opposite direction as well, with virtual layer issues impacting the physical layer. For example, a malfunctioning set of VMs can overburden memory requirements in a physical server.

Within the physical layer, the physical devices (e.g., servers 835) can be connected with physical entities 836, 838, 840. These physical entities can be physical routers and network interfaces. In this example, a problem occurs at network interface 840. This problem can impact the other physical and virtual resources, some of which may report symptoms and be included as impacted network resources in the problem notification. For example, the VM 821 may malfunction based on network problems at the network interface 840. The impacted VM 821 can report a symptom to the analytics engine in an example. A service 822 that relies on the VM 821 can similarly report symptoms to the analytics engine. Coupled with an alert from the network interface 840, the analytics engine can issue a problem notification. The problem can originate at network interface 840 (a physical entity) and include impacted network resources VM 821 (a virtual entity) and service 822 (service degradation).

The prioritization engine can receive multiple such problem notifications. The prioritization engine can prioritize these problem notifications by creating a PI matrix and determining a PI weight for the problems, as described above. The prioritized problems can be displayed on a GUI.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for alarm prioritization in a Telco network, comprising:
    constructing a mapping matrix that maps network resource types to problem weights for different tenants that share a common set of network resources,
        wherein the network resources correspond to resource types in at least physical, virtual, and service layers of the Telco network,
        wherein the mapping matrix includes different problem weights for the physical, virtual, and service layers relative to one another,
        wherein the mapping matrix includes two rows for different tenants, and wherein the problem weights of the respective physical, virtual, and service layers in the two rows differ for the different tenants, and
        wherein the tenants include different customers of a provider of the Telco network;
    receiving notifications of problems, wherein the notifications indicate performance symptoms that correspond to the network resources;
    for multiple problems, assigning impact weights for the performance symptoms based on the problem weights of the mapping matrix, wherein the impact weights are determined based on which tenants are associated with the network resources implicated by the performance symptoms; and
    prioritizing alerts for the problems on a graphical user interface ("GUI") based on the impact weights of the problems.

2. The method of claim 1, wherein a dimension of the mapping matrix corresponds to different classes of service to which the tenants are assigned, and wherein the classes of service act as multipliers for calculating the problem weights.

3. The method of claim 1, wherein assigning impact weights includes determining the resource type based on whether the network resource exists in the physical, virtual, or services layer of the Telco network.

4. The method of claim 1, wherein assigning impact weights includes determining edge weight values in a graph, the edge weight values corresponding to the network resources having the performance symptoms, wherein the edge weight values are based on which tenants correspond to the network resources having the performance symptoms.

5. The method of claim 1, wherein assigning the impact weights includes:
    creating a table having a first dimension for problems and a second dimension for impacted network components, the impacted network components for a first problem being the network components associated with the performance symptoms for that problem; and
    populating the table with the impact weights by retrieving problem weights from the mapping matrix based on which tenants are associated with the impacted resources.

6. The method of claim 5, wherein a first symptom corresponding to a first network resource is used to determine a first tenant is impacted by the problem, and wherein the corresponding impact weight is populated from the mapping matrix based on identifying the first tenant and the resource type of the first network resource.

7. The method of claim 1, wherein prioritizing the alerts includes ranking problems based on failure costs, and wherein the failure costs are based on tenant-specific costs for downtime.

8. A non-transitory, computer-readable medium comprising instructions that, when executed by a processor, perform stages for alarm prioritization in a Telco network, the stages comprising:
    constructing a mapping matrix that maps network resource types to problem weights for different tenants that share a common set of network resources,
        wherein the network resources correspond to resource types in at least physical, virtual, and service layers of the Telco network,
        wherein the mapping matrix includes a first dimension for the resource types and a second dimension for different classes of services that correspond to the tenants,
        wherein the respective resource types have different problem weights between the different classes of service that correspond to the tenants, and
        wherein the tenants include different customers of a provider of the Telco network;
    receiving notifications of problems, wherein the notifications indicate performance symptoms that correspond to the network resources;
    for multiple problems, assigning impact weights for the performance symptoms based on the problem weights of the mapping matrix, wherein the impact weights are determined based on which tenants are associated with the network resources implicated by the performance symptoms; and
    prioritizing alerts for the problems on a graphical user interface ("GUI") based on the impact weights of the problems.

9. The non-transitory, computer-readable medium of claim 8, wherein the mapping matrix includes different problem weights for the physical, virtual, and service layers relative to one another, and wherein the classes of service act as multipliers for calculating the problem weights.

10. The non-transitory, computer-readable medium of claim 8, wherein assigning impact weights includes determining the resource type based on whether the network resource exists in the physical, virtual, or services layer of the Telco network.

11. The non-transitory, computer-readable medium of claim 8, wherein assigning impact weights includes determining edge weight values in a graph, the edge weight values corresponding to the network resources having the performance symptoms, wherein the edge weight values are based on which tenants correspond to the network resources having the performance symptoms.

12. The non-transitory, computer-readable medium of claim 8, wherein assigning the impact weights includes:
creating a table having a first dimension for problems and a second dimension for impacted network components, the impacted network components for a first problem being the network components associated with the performance symptoms for that problem; and
populating the table with the impact weights by retrieving problem weights from the mapping matrix based on which tenants are associated with the impacted resources.

13. The non-transitory, computer-readable medium of claim 12, wherein a first symptom corresponding to a first network resource is used to determine a first tenant is impacted by the problem, and wherein the corresponding impact weight is populated from the mapping matrix based on identifying the first tenant and the resource type of the first network resource.

14. The non-transitory, computer-readable medium of claim 8, wherein prioritizing the alerts includes ranking problems based on failure costs, and wherein the failure costs are based on tenant-specific costs for downtime.

15. A system for alarm prioritization in a Telco network, comprising:
a non-transitory, computer-readable medium containing instructions; and
a processor that executes the instructions perform stages comprising:
constructing a mapping matrix that maps network resource types to problem weights for different tenants that share a common set of network resources,
wherein the network resources correspond to resource types in at least physical, virtual, and service layers of the Telco network,
wherein the mapping matrix includes a graph with different resource type weights for the physical, virtual, and service layers relative to one another,
wherein the mapping matrix includes different tenant classes, and wherein the problem weights of the respective physical, virtual, and service layers in the two rows differ for the different tenants that are assigned to different tenant classes, and
wherein the tenants include different customers of a provider of the Telco network;
receiving notifications of problems, wherein the notifications indicate performance symptoms that correspond to the network resources;
for multiple problems, assigning impact weights for the performance symptoms based on the problem weights of the mapping matrix, wherein the impact weights are determined based on which tenants are associated with the network resources implicated by the performance symptoms; and
prioritizing alerts for the problems on a graphical user interface ("GUI") based on the impact weights of the problems.

16. The system of claim 15, wherein the mapping matrix further includes different classes of service to which the tenants are assigned, and wherein the classes of service act as multipliers against the resource type weights for calculating the problem weights.

17. The system of claim 15, wherein assigning impact weights includes determining the resource type based on whether the network resource exists in the physical, virtual, or services layer of the Telco network.

18. The system of claim 15, wherein assigning impact weights includes determining edge weight values in a graph, the edge weight values corresponding to the network resources having the performance symptoms, wherein the edge weight values are based on which tenants correspond to the network resources having the performance symptoms.

19. The system of claim 18, wherein assigning the impact weights includes:
creating a table having a first dimension for problems and a second dimension for impacted network components, the impacted network components for a first problem being the network components associated with the performance symptoms for that problem; and
populating the table with the impact weights by retrieving problem weights from the mapping matrix based on which tenants are associated with the impacted resources.

20. The system of claim 15, wherein prioritizing the alerts includes ranking problems based on failure costs, and wherein the failure costs are based on tenant-specific costs for downtime.

* * * * *